(12) United States Patent
Yapici et al.

(10) Patent No.: US 11,757,694 B1
(45) Date of Patent: Sep. 12, 2023

(54) HYBRID REFERENCE SIGNAL DESIGN AND TRANSMISSION OF PHY SIGNALS

(71) Applicant: QUALCOMM Incorporated, San Diego, CA (US)

(72) Inventors: Yavuz Yapici, Florham Park, NJ (US); Igor Gutman, Hod HaSharon (IL); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/653,263

(22) Filed: Mar. 2, 2022

(51) Int. Cl.
*H04L 27/36* (2006.01)
*H04B 1/04* (2006.01)
*H04L 27/38* (2006.01)

(52) U.S. Cl.
CPC .......... *H04L 27/361* (2013.01); *H04B 1/0475* (2013.01); *H04L 27/38* (2013.01)

(58) Field of Classification Search
CPC ...... H04L 27/361; H04L 27/38; H04B 1/0475
See application file for complete search history.

(56) References Cited

U.S. PATENT DOCUMENTS

2010/0069119 A1\* 3/2010 Mueck ............... H04W 8/02 455/561

\* cited by examiner

*Primary Examiner* — Vineeta S Panwalkar
(74) *Attorney, Agent, or Firm* — Procopio, Cory, Hargreaves & Savitch

(57) ABSTRACT

A first network node may transmit, to a second network node via a PHY SERS, and the second network node may receive, from the first network node via the PHY SERS, an indication of a first subset of a set of parameters associated with a PHY signature. The first network node may transmit, to the second network node via L3 signaling, and the second network node may receive, from the first network node via L3 signaling, an indication of a remaining subset of the set of parameters associated with the PHY signature. The first network node may transmit, to the second network node, and the second network node may receive, from the first network node, a message based on the PHY signature. The second network node may decode the message based on the PHY signature.

30 Claims, 12 Drawing Sheets understand # HYBRID REFERENCE SIGNAL DESIGN AND TRANSMISSION OF PHY SIGNALS

TECHNICAL FIELD

The present disclosure relates generally to communication systems, and more particularly, to physical layer (PHY) security in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first network node. The apparatus may transmit, to a second network node via a physical layer (PHY) security reference signal (RS) (SERS), an indication of a first subset of a set of parameters associated with a PHY signature. The apparatus may transmit, to the second network node via layer 3 (L3) signaling, an indication of a remaining subset of the set of parameters associated with the PHY signature. The apparatus may transmit, to the second network node, a message based on the PHY signature.

In an aspect of the disclosure, a method, a computer-readable medium, and an apparatus are provided. The apparatus may be a second network node. The apparatus may receive, from a first network node via a PHY SERS, an indication of a first subset of a set of parameters associated with a PHY signature. The apparatus may receive, from the first network node via L3 signaling, an indication of a remaining subset of the set of parameters associated with the PHY signature. The apparatus may receive, from the first network node, a message based on the PHY signature. The apparatus may decode the message based on the PHY signature.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
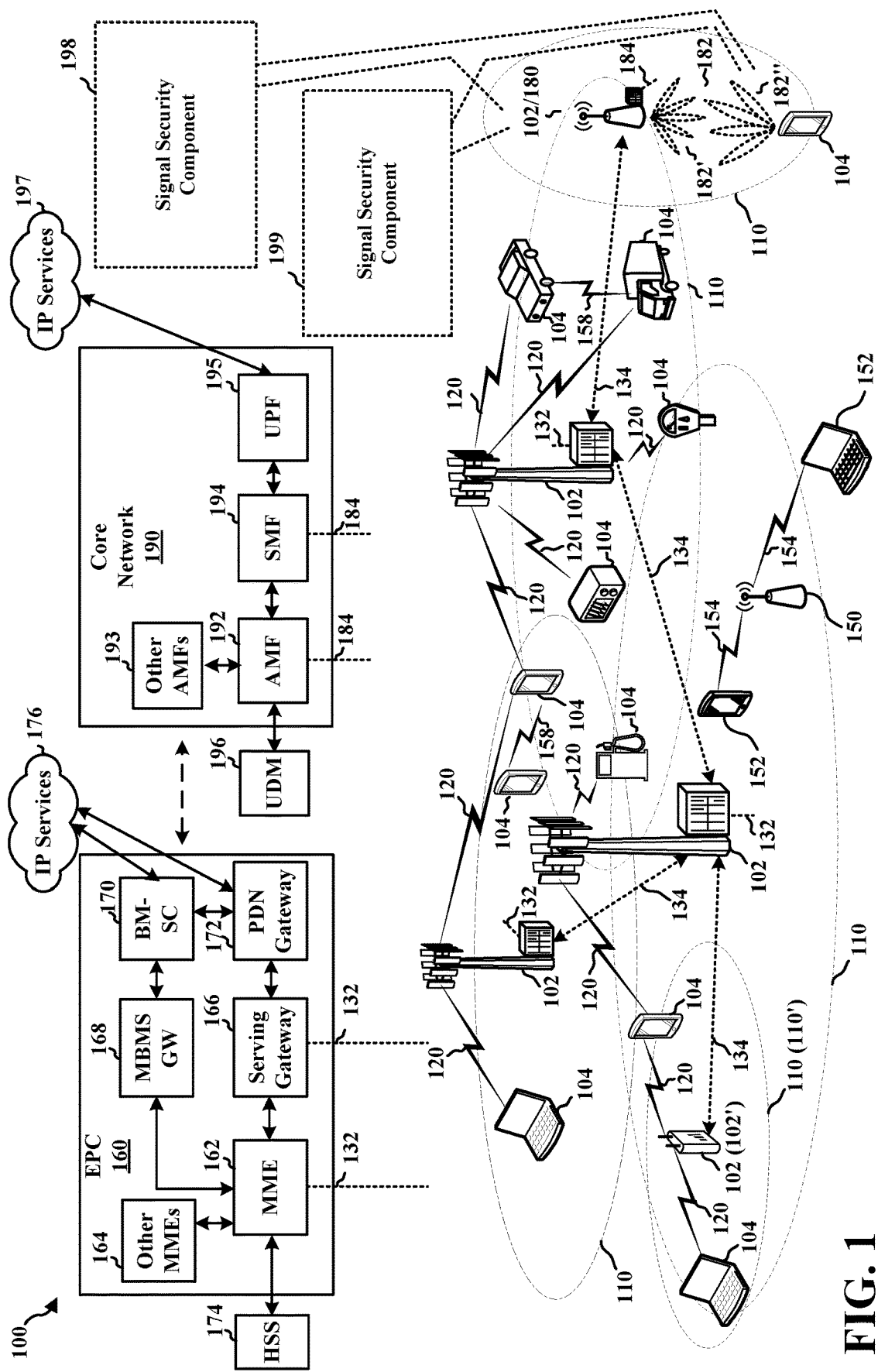
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, when operating as a transmitter, the UE 104 or the base station/network node 180 may include a signal security component 198 that may be configured to transmit, to a second network node via a PHY SERS, an indication of a first subset of a set of parameters associated with a PHY signature. The signal security component 198 may be configured to transmit, to the second network node via L3 signaling, an indication of a remaining subset of the set of parameters associated with the PHY signature. The signal security component 198 may be configured to transmit, to the second network node, a message based on the PHY signature. In certain aspects, when operating as a receiver, the UE 104 or the base station/network node 180 may include a signal security component 199 that may be configured to receive, from a first network node via a PHY SERS, an indication of a first subset of a set of parameters associated with a PHY signature. The signal security component 199 may be configured to receive, from the first network node via L3 signaling, an indication of a remaining subset of the set of parameters associated with the PHY signature. The signal security component 199 may be configured to receive, from the first network node, a message based on the PHY signature. The signal security component 199 may be configured to decode the message based on the PHY signature. Although the following description may be focused on 5G NR, the concepts described herein may be applicable to other similar areas, such as LTE, LTE-A, CDMA, GSM, and other wireless technologies.

Figure 2:
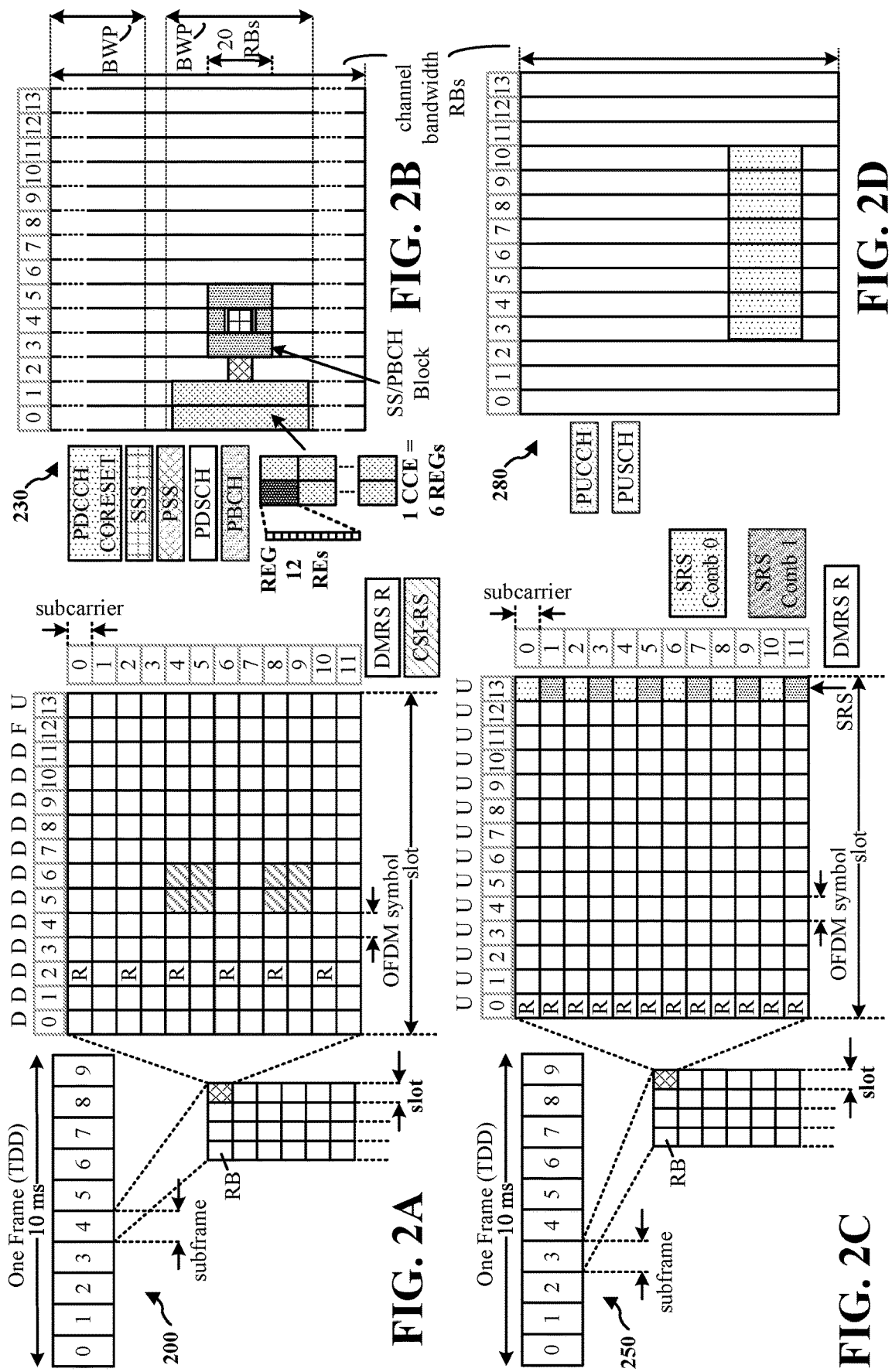
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
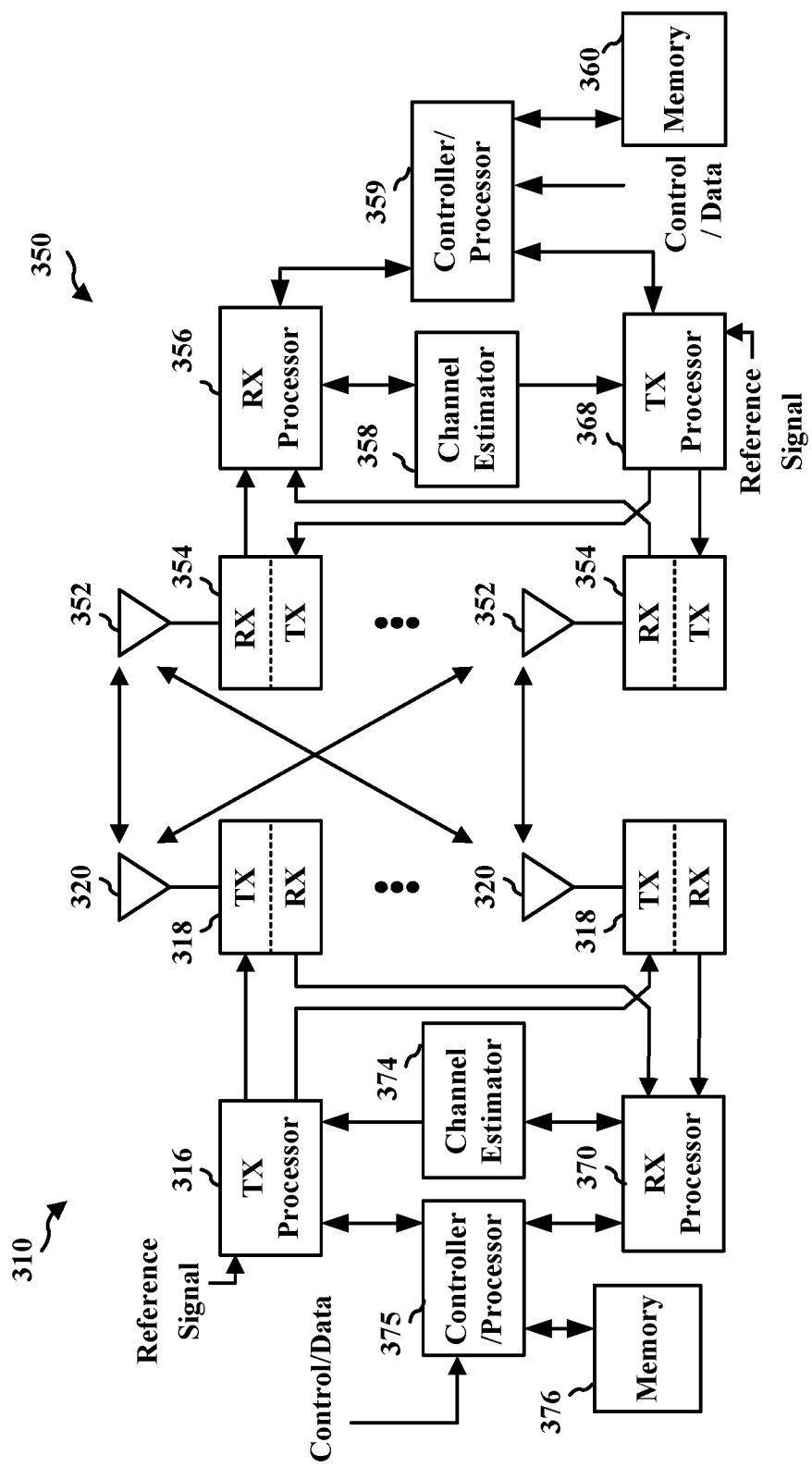
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 or 199 of FIG. 1.

At least one of the TX processor 316, the RX processor 370, and the controller/processor 375 may be configured to perform aspects in connection with 198 or 199 of FIG. 1.

Herein a network node can be implemented as an aggregated base station, as a disaggregated base station, an integrated access and backhaul (IAB) node, a relay node, a sidelink node, etc. A network node/entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

User privacy and data confidentiality may be an integral part of any secure and reliable transmission protocol. Wireless communication security may aim at providing sufficient confidentiality and integrity for the data, and ensuring availability of network services (e.g., against denial attacks) through upper layer cryptographic functionalities.

Absent security (confidentiality or integrity) protection, layer 1 (L1)/layer 2 (L2) signaling and/or physical control channels (e.g., PDCCH, MAC-control element (CE) (MAC-CE), etc.) may be vulnerable to malicious attacks. Some existing cryptographic algorithms may not be suitable for providing security in PHY because they may be implemented in the upper layers after RRC connection establishment, but not in PHY.

Adding a PHY signature to PHY messages may provide security and reliability. In some examples, signaling over PHY links may be used to transmit the PHY signature. Accordingly, signaling over PHY links may need to be protected against malicious attacks.

One or more aspects of the disclosure may relate to an RS design and a corresponding transmission mechanism to convey PHY signature parameters over PHY links in a secure and reliable fashion.

Artificial PHY impairment (signature) embedding may be an effective way of providing security and reliability in PHY. In particular, a receiver that knows the PHY signature may be able to remove the PHY signature impairment from the received impaired PHY message and recover the original PHY message. On the other hand, an eavesdropper that does not know the PHY signature may be unable to recover the original PHY message. In some examples, the PHY signature may be an amplitude-modulation-to-phase-modulation (AMPM) signature. In some other examples, the PHY signature may be a frequency domain residual sideband (FDRSB) (i.e., in-phase (I)/quadrature (Q) mismatch) signature.

In one or more configurations, the transmitter may embed an artificially generated PHY signature (which may be unique) into the transmitted signal in PHY. The added PHY signature may be removed by a receiver that has the knowledge about the embedded PHY signature, but not by any other receiver (e.g., an eavesdropper) that may not have any information or sufficient information about the embedded PHY signature. Accordingly, the embedded PHY signature may prevent a passive eavesdropper from being able to demodulate the message correctly (since the eavesdropper may not know the PHY signature), even if the eavesdropper succeeds in capturing the impaired PHY message.

This PHY security technique may be particularly effective for L1 signaling and PHY control channels, which may otherwise not be protected against malicious attacks. To implement the PHY security technique based on the PHY signature, an indication of the type and the parameters of the embedded PHY signature may be transmitted from the transmitter to the receiver before the transmitter starts to transmit impaired messages. In different configurations, the indication of the type and the parameters of the embedded PHY signature may be transmitted from the transmitter to the receiver through L3 signaling or via a PHY SERS.

Although L3 signaling is secure (because cryptographic algorithms may be used in L3 signaling), the data exchange via L3 signaling may be slow. On the other hand, the data exchange via the PHY SERS may be fast compared to the data exchange via L3 signaling. However, because the PHY SERS is not encrypted, further reinforcement against malicious attacks may be needed for the data exchange via the PHY SERS.

Figure 4:
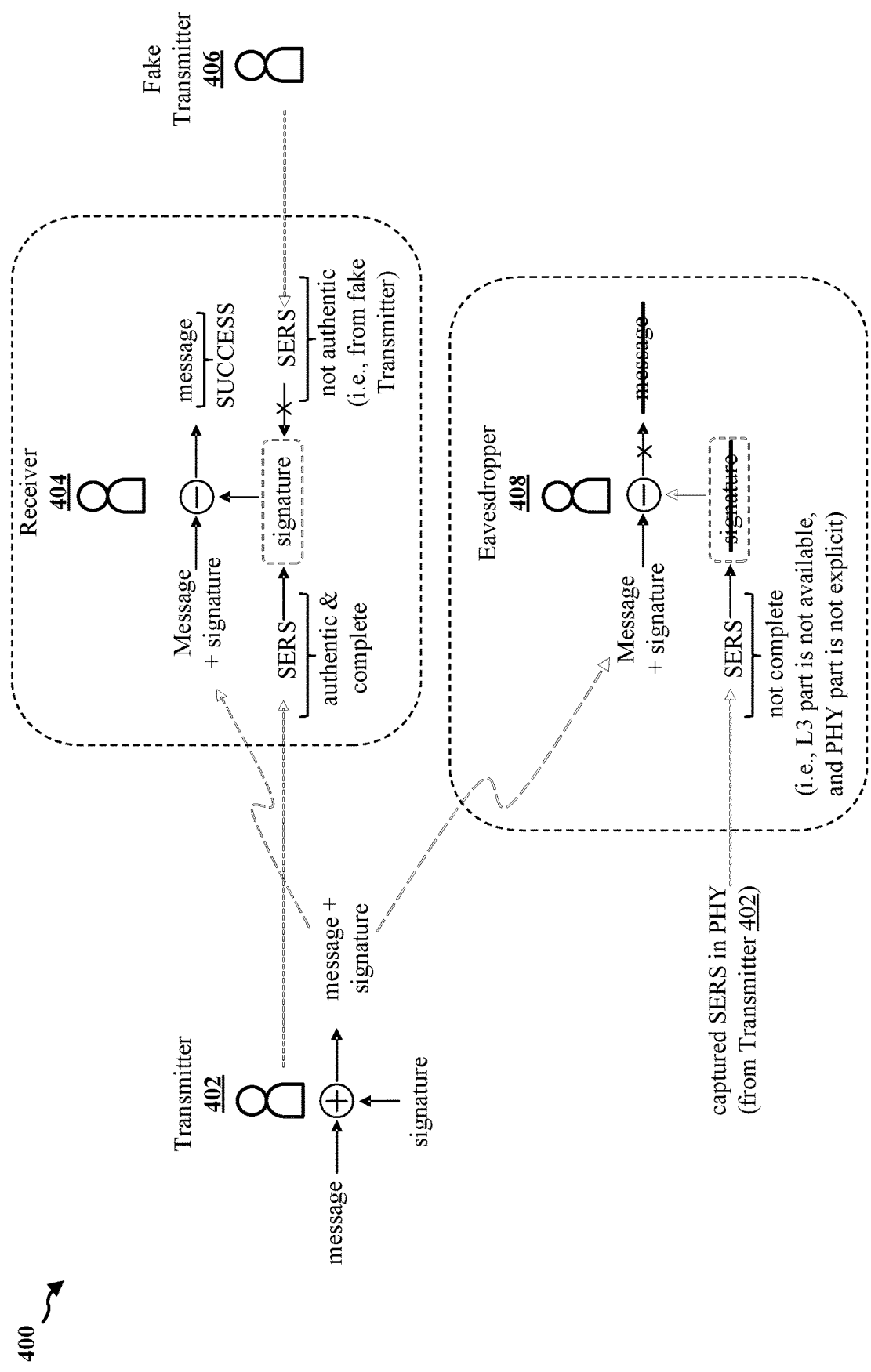
FIG. 4 is a diagram illustrating an example environment in which aspects may be practiced.

FIG. 4 is a diagram illustrating an example environment 400 in which aspects may be practiced. One or more aspects of the disclosure may relate to a hybrid SERS design for the PHY signature that may be resilient against attacks by passive and active adversaries alike through authentication (i.e., verifying the legitimacy of the transmitter) and PHY-secure SERS transmission.

In one or more configurations, a legitimate receiver 404 may verify the legitimacy of the transmitter sending the SERS via authentication before attempting to remove the PHY signature from received messages based on the parameters of the PHY signature conveyed by the SERS. Accordingly, a fake transmitter 406 sending a fake SERS may not mislead the receiver 404 with an incorrect PHY signature. Rejecting an incorrect PHY signature may be suitable or desirable because an incorrect PHY signature may cause the receiver 404 to not be able to demodulate the received message (e.g., a DCI message of a PDCCH).

In some configurations, it may also be desirable to prevent a passive adversary (e.g., the eavesdropper 408) from being able to learn the PHY signature by capturing the SERS alone. Accordingly, one or more aspects of the disclosure may relate to a hybrid SERS design and secure SERS transmission in PHY. Accordingly, the eavesdropper 408 may be prevented from learning the PHY signature (even if the eavesdropper 408 succeeds in capturing the PHY SERS) and demodulating the messages impaired by that PHY signature (e.g., a PDCCH, a wake-up signal (WUS), etc.).

In one or more configurations, a SERS may include an authentication proof to enable the receiver 404 to verify the legitimacy of the transmitter. The receiver 404 may treat SERSs not providing or including a valid authentication proof as fake, and may discard any such fake SERSs. In particular, a portion of a SERS (transmitted either in PHY or over L3 links) may carry an authentication tag. In one configuration, the authentication tag may be a function of time (so as to prevent any adversary from reusing (e.g., recording and playing back) the same authentication tag in the future) and a credential that may be known to the transmitter-receiver pair but not to other parties.

In one or more configurations, the function producing the authentication tag may be uninvertible (e.g., a cryptographic hash function) to prevent any adversary from learning the credential by observing the authentication tag itself. In one or more configurations, the credential may be a cryptographic key known to the transmit-receive pair but not to other parties. In another example, the credential may be a temporary unique identifier (ID) (e.g., a temporary ID assigned to the receiver by the network, such a globally unique temporary ID (GUTI)).

In one or more configurations, a complete set of parameters for the PHY signature may be split into two subsets, such that one subset may be conveyed in a SERS in PHY (i.e., a PHY SERS), and the other subset may be sent over L3 links. Accordingly, a passive adversary (e.g., the eavesdropper 408) may not be able to learn the complete PHY signature by capturing the PHY SERS alone, as the subset of PHY signature parameters transmitted via L3 signaling may be protected by cryptography. As the eavesdropper 408 may not obtain the complete set of PHY signature parameters, the eavesdropper may not successfully demodulate a message from the transmitter 402 that may be impaired by the PHY signature.

In one configuration, the network may configure the size of each part/subset of the PHY signature parameters to achieve an appropriate compromise or balance between the fast exchange via the PHY SERS and the slow but secure exchange over L3 links. A reasonably speedy PHY signature transmission may be desirable or beneficial because the transmitter may periodically or from time to time update the PHY signature in use to further improve and ensure security.

Figure 5:
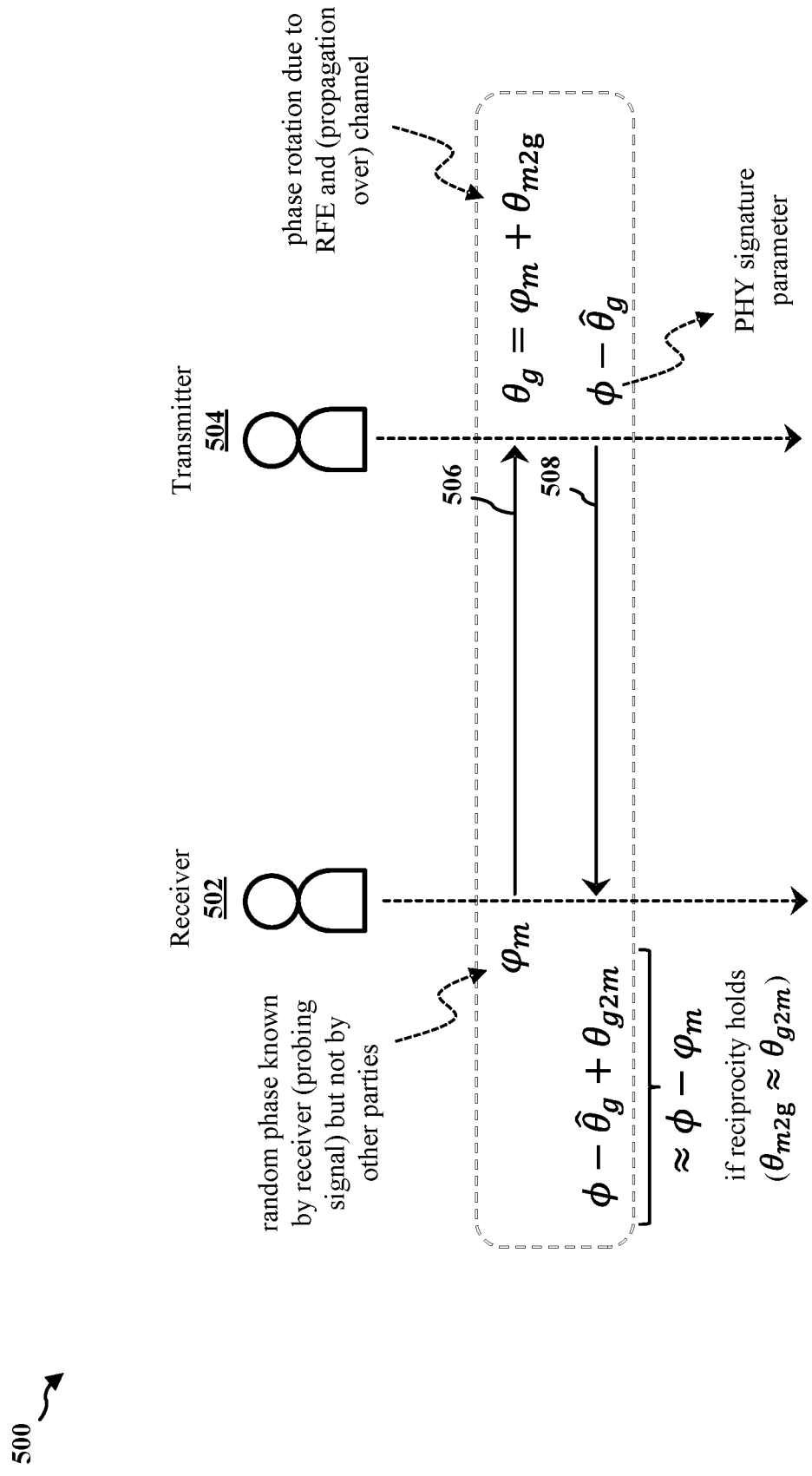
FIG. 5 is a diagram illustrating an example method for implementing a secure PHY SERS based on differences of PHY features.

FIG. 5 is a diagram 500 illustrating an example method for implementing a secure PHY SERS based on differences of PHY features. In one or more configurations, the PHY signature parameters may be conveyed in a SERS over PHY links (i.e., a PHY SERS) not explicitly, but based on a difference between the parameters and measured channel response features (e.g., a received signal strength (RSS), an amplitude, a phase, etc.).

In particular, in one configuration, at 506, the receiver 502 may send a probing packet to the transmitter 504 (which may have been authenticated) using an RS (e.g., a CSI-RS if the link is DL, or an SRS if the link is UL, or another specifically designed RS, etc.). Next, the transmitter 504 may measure a channel response feature (the transmitter 504 and the receiver 502 may have agreed previously on the channel response feature to measure) based on the RS. Next, the transmitter 504 may compute the difference between the PHY signature parameter to be conveyed and the measured channel response feature. Thereafter, at 508, the transmitter 504 may send the difference to the receiver 502 (with suitable or appropriate modulation) using an RS (e.g., a CSI-RS, an SRS, or another specifically designed RS, etc.). Therefore, the receiver 502 may obtain the PHY signature parameter as the receiver 502 knows the content of the probing packet.

The above procedure may be completed for each PHY signature parameter to be transmitted via the PHY SERS. In one configuration, the procedures for multiple PHY signature parameters may be performed simultaneously using different frequency domain subcarriers. The procedures may be performed within the coherence time (e.g., to ensure that reciprocity holds). Accordingly, due to the uniqueness of the channel response between the receiver 502 and the transmitter 504, no adversary may learn the PHY signature parameters conveyed in the PHY SERS even if the adversary is able to capture the PHY SERS because in all likelihood the channel response between an adversary and the transmitter 504 may not be the same as the channel response between the receiver 502 and the transmitter 504.

In one or more other configurations, the PHY signature may also be referenced by an index within a pool (set) of all possible PHY signatures, where the pool (set) of all possible PHY signatures may be preconfigured, and may be known to the transmit-receive pair. In such a case, the above technique may be used to securely transmit the index of the PHY signature within the PHY SERS.

FIG. 5 illustrates an example in which the PHY signature parameters are transmitted in SERSs over PHY links (i.e., PHY SERSs) based on a phase difference between a measured channel phase response feature and the PHY signature parameter. In particular, the phase parameter $\phi$ (which may represent a portion of the PHY signature parameters) may be sent in the form of a difference between the phase parameter $\phi$ and the channel phase response $\theta_g$ between the transmitter 504 and the receiver 502 (i.e., $(\phi-\hat{\theta}_g)$ (the difference between $\theta_g$ and $\hat{\theta}_g$ may be due to measurement errors and/or other imperfections that may reduce the reciprocity). Accordingly, an adversary measuring the transmitted phase difference $\phi-\hat{\theta}_g$ may not learn the phase parameter $\phi$ because the adversary may not know the channel phase response $\theta_g$ between the transmitter 504 and the receiver 502. However, the legitimate receiver 502 may be able to learn the phase parameter $\phi$ because the received phase at 508 may be equal to $\phi-\varphi_m$ as a result of channel reciprocity (e.g., the phase rotation caused by the RF front-end (RFE) and the channel condition may be the same in either communication direction, the phase rotations being $\theta_{m2g}$ and $\theta_{g2m}$, respectively). Further, the receiver 502 may know the random phase $\varphi_m$ as the receiver 502 itself previously at 506 injected this phase $\varphi_m$ into the channel to produce the channel phase response $\theta_g$ at the transmitter 504. Accordingly, the receiver 502 may learn the phase parameter $\phi$ based on the received phase $\phi-\varphi_m$ at 508 and the knowledge about the phase $\varphi_m$.

Due to possible channel non-reciprocity (e.g., due to RF front-end calibration errors between the DL and UL) and errors in estimating the channel phase response, the phase measured by the receiver 502 at 508 may not be equal to $\phi-\varphi_m$. Therefore, a procedure may be utilized to ensure that the above technique may not be used when the results are likely to be incorrect or unreliable. In particular, in one or more example configurations where the channel phase response feature is utilized, the transmitter 504-receiver 502 pair may exchange (e.g., periodically) a probing packet set with a known phase parameter $\phi$ to quantify the error associated with the estimate at the receiver 502 for $\phi-\varphi_m$. If the measured error is below a threshold, then the PHY signature parameter transmission based on the above technique may be used. Otherwise the PHY signature parameter transmission based on the above technique may be suspended until the measured error falls below the threshold. In one or more examples, the threshold may be configured by the network, either dynamically or statically.

In one or more configurations, the receiver 502 may change the random phase $\varphi_m$ injected at 506 into the channel over time and/or with respect to the specific beam pair in use. In one or more configurations, the PHY signature parameter transmission based on the above technique may be carried out using multiple beams. Although the channel phase response is utilized in the configurations illustrated in FIG. 5, other channel response features, such as the RSS or the amplitude, may also be utilized.

The various aspects and configurations described above may be used individually or in combination with each other based on the feedback or knowledge that the transmitter and/or receiver have regarding the type of the adversarial attack (e.g., no information, presence of a fake base station/transmitter, presence of a passive adversary/eavesdropper, etc.) and/or the network security or reliability QoS specification. The transmitter and/or the receiver may be configured accordingly.

In one or more configurations, in order to suppress leakage towards undesired directions potentially involving eavesdroppers (e.g., directions other than the direction of the legitimate receiver), the transmitter may transmit the PHY SERS in a directional fashion (e.g., based on beamforming). Further, in one or more configurations, the network may configure a quasi co-location (QCL) relationship between a directional PHY SERS and a PHY message (e.g., a PDCCH, etc.) or an RS.

Figure 6:
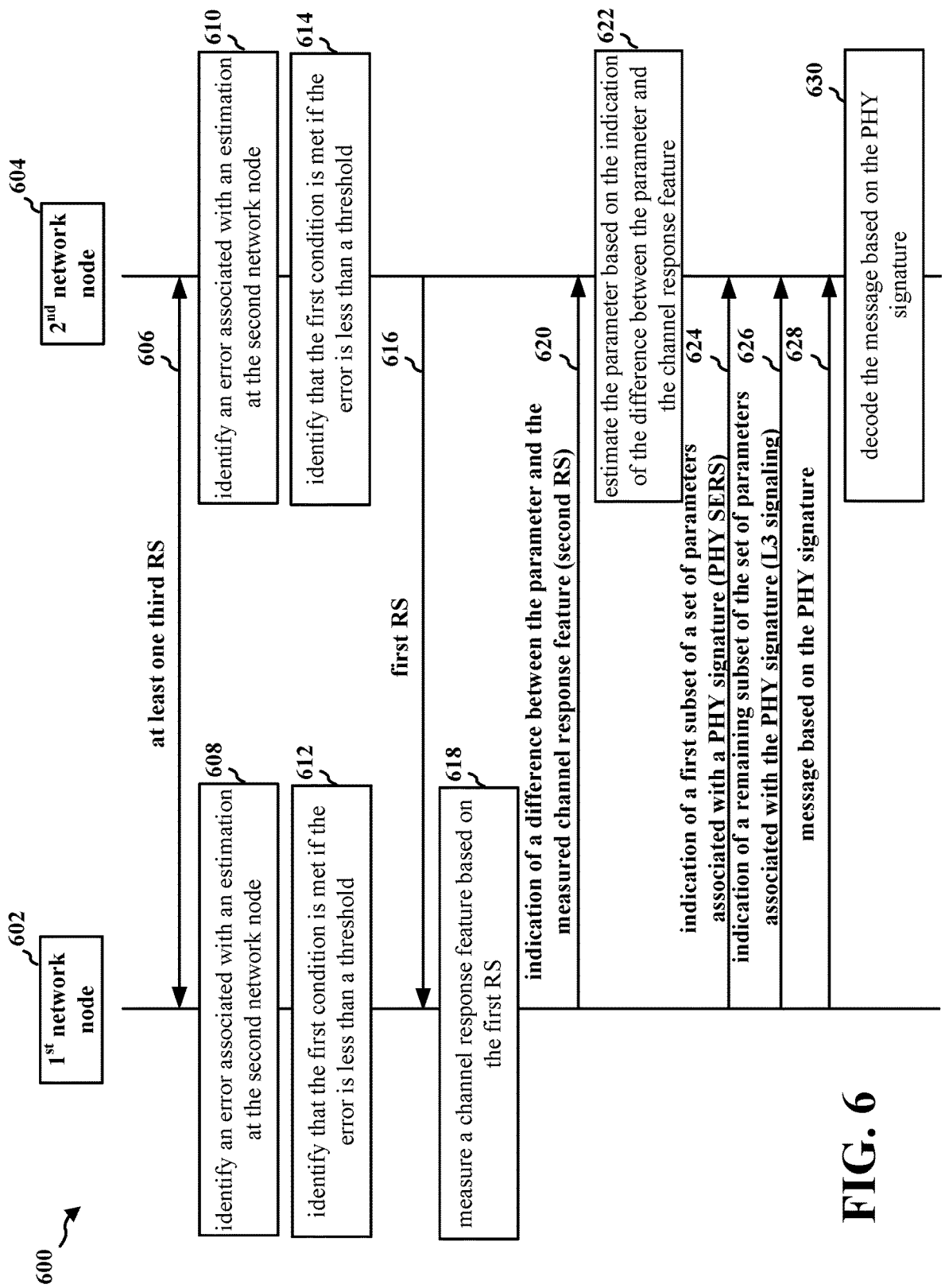
FIG. 6 is a diagram of a communication flow of a method of wireless communication.

FIG. 6 is a diagram of a communication flow 600 of a method of wireless communication. At 606, the first network node 602 and the second network node 604 may exchange at least one third RS.

At 608, the first network node 602 may identify an error associated with an estimation at the second network node 604 of a difference between a reference parameter and a reference channel response feature associated with the at least one third RS 606.

At 610, the second network node 604 may identify an error associated with an estimation at the second network node 604 of a difference between a reference parameter and a reference channel response feature associated with the at least one third RS 606. In different configurations, either one or both of 608 and 610 may be performed.

In one configuration, the error may be associated with a channel non-reciprocity or a second error associated with channel response estimation.

At 612, the first network node 602 may identify that the first condition is met if the error is less than a threshold.

At 614, the second network node 604 may identify that the first condition is met if the error is less than a threshold. In different configurations, either one or both of 612 and 614 may be performed.

At 616, if the first condition is met, for each PHY signature parameter to be transmitted via the PHY SERS, the second network node 604 may transmit, to the first network node 602, and the first network node 602 may receive, from the second network node 604, a first RS. For example, the first RS may include a probing packet/signal.

At 618, if the first condition is met, for each PHY signature parameter to be transmitted via the PHY SERS, the first network node 602 may measure a channel response feature based on the first RS 616.

In one configuration, the channel response feature may be based on a first parameter in the first RS or a channel response. The first parameter may be based on a time or a beam pair.

At 620, if the first condition is met, for each PHY signature parameter to be transmitted via the PHY SERS, the first network node 602 may transmit, to the second network node 604 via a second RS, and the second network node 604 may receive, from the first network node 602 via the second RS, an indication of a difference between the PHY signature parameter and the measured channel response feature.

In one configuration, at least one of the first RS or the second RS may be a CSI-RS or an SRS.

In one configuration, the first RS and/or the second RS may be via a subcarrier corresponding to the parameter.

At 622, if the first condition is met, for each PHY signature parameter to be transmitted via the PHY SERS, the second network node 604 may estimate the PHY signature parameter based on the indication of the difference between the PHY signature parameter and the channel response feature.

At 624, the first network node 602 may transmit, to a second network node 604 via a PHY SERS, and the second network node 604 may receive, from the first network node 602 via the PHY SERS, an indication of a first subset of a set of parameters associated with a PHY signature.

In one configuration, the PHY signature may be an AMPM signature. The set of parameters associated with the PHY signature may include one or more of a number of cycles, a delay, a frequency of a sinusoidal function, or an amplitude of the sinusoidal function.

In one configuration, the PHY signature may be an FDRSB signature. The set of parameters associated with the PHY signature may include a plurality of filter parameters associated with an FDRSB.

In one configuration, the PHY SERS may be associated with a direction. A fourth RS may be associated with the PHY SERS based on a QCL relationship.

At 626, the first network node 602 may transmit, to the second network node 604 via L3 signaling, and the second network node 604 may receive, from the first network node 602 via L3 signaling, an indication of a remaining subset of the set of parameters associated with the PHY signature. The union of the first subset and the remaining subset may be equal to the set of parameters associated with the PHY signature.

In one configuration, the L3 signaling may correspond to RRC signaling.

In one configuration, at least one of the PHY SERS or the L3 signaling may include an authentication tag associated with the first network node. The authentication tag may be based at least on a time.

In one configuration, the authentication tag may be based further on an uninvertible function or a credential known to the first network node 602 and the second network node 604.

In one configuration, the credential may correspond to a cryptographic key or a unique ID.

At 628, the first network node 602 may transmit, to the second network node 604, and the second network node 604 may receive, from the first network node 602, a message based on the PHY signature.

At 630, the second network node 604 may decode the message based on the PHY signature.

Figure 7:
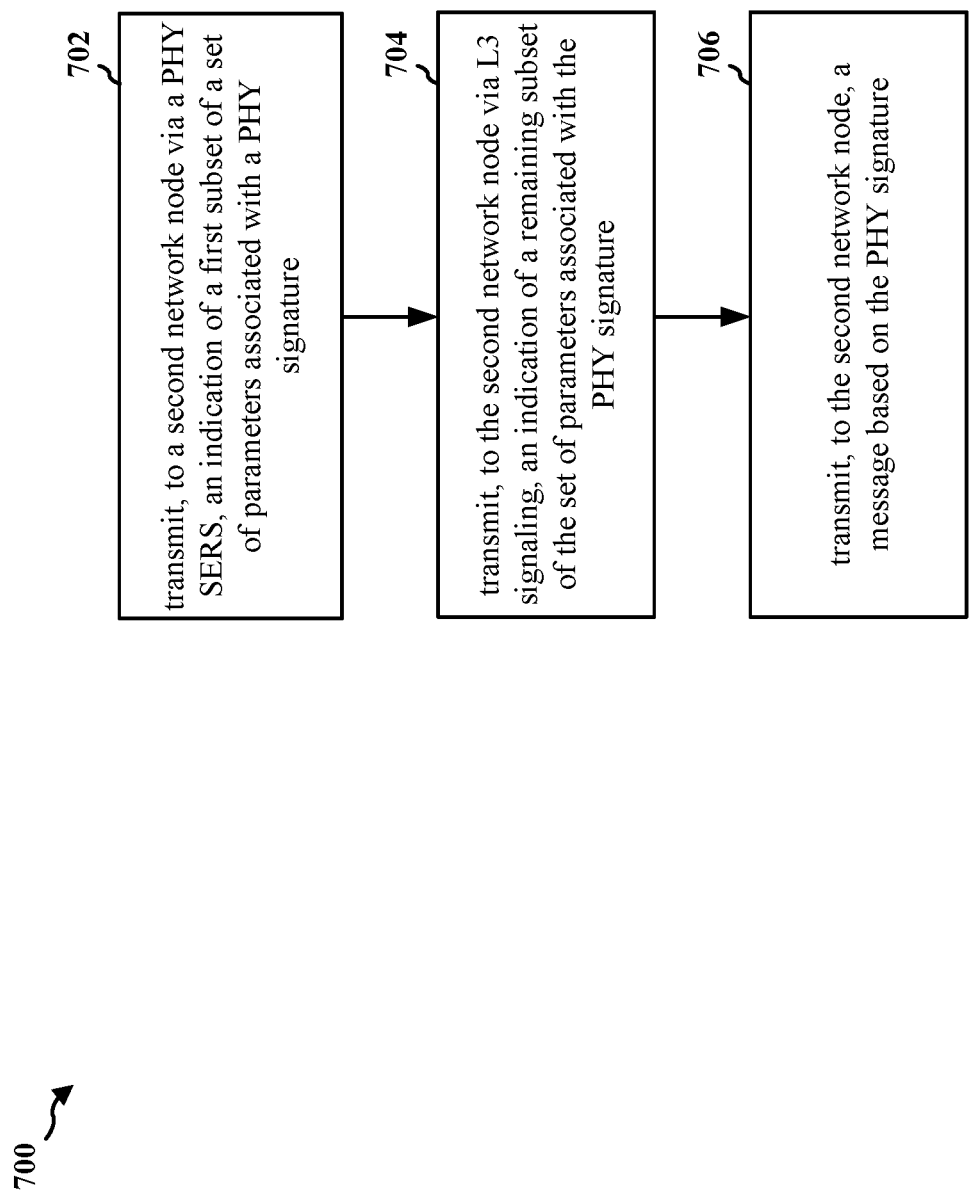
FIG. 7 is a flowchart of a method of wireless communication.

FIG. 7 is a flowchart 700 of a method of wireless communication. The method may be performed by a first network node (e.g., a transmitter) (e.g., the UE 104/350; the base station/network node 102/180/310; the first network node 602; the apparatus 1102). At 702, the first network node may transmit, to a second network node via a PHY SERS, an indication of a first subset of a set of parameters associated with a PHY signature. For example, 702 may be performed by the signal security component 1140 in FIG. 11. Referring to FIG. 6, at 624, the first network node 602 may transmit, to a second network node 604 via a PHY SERS, an indication of a first subset of a set of parameters associated with a PHY signature.

At 704, the first network node may transmit, to the second network node via L3 signaling, an indication of a remaining subset of the set of parameters associated with the PHY signature. For example, 704 may be performed by the signal security component 1140 in FIG. 11. Referring to FIG. 6, at 626, the first network node 602 may transmit, to the second network node 604 via L3 signaling, an indication of a remaining subset of the set of parameters associated with the PHY signature.

At 706, the first network node may transmit, to the second network node, a message based on the PHY signature. For example, 706 may be performed by the signal security component 1140 in FIG. 11. Referring to FIG. 6, at 628, the first network node 602 may transmit, to the second network node 604, a message based on the PHY signature.

Figure 8:
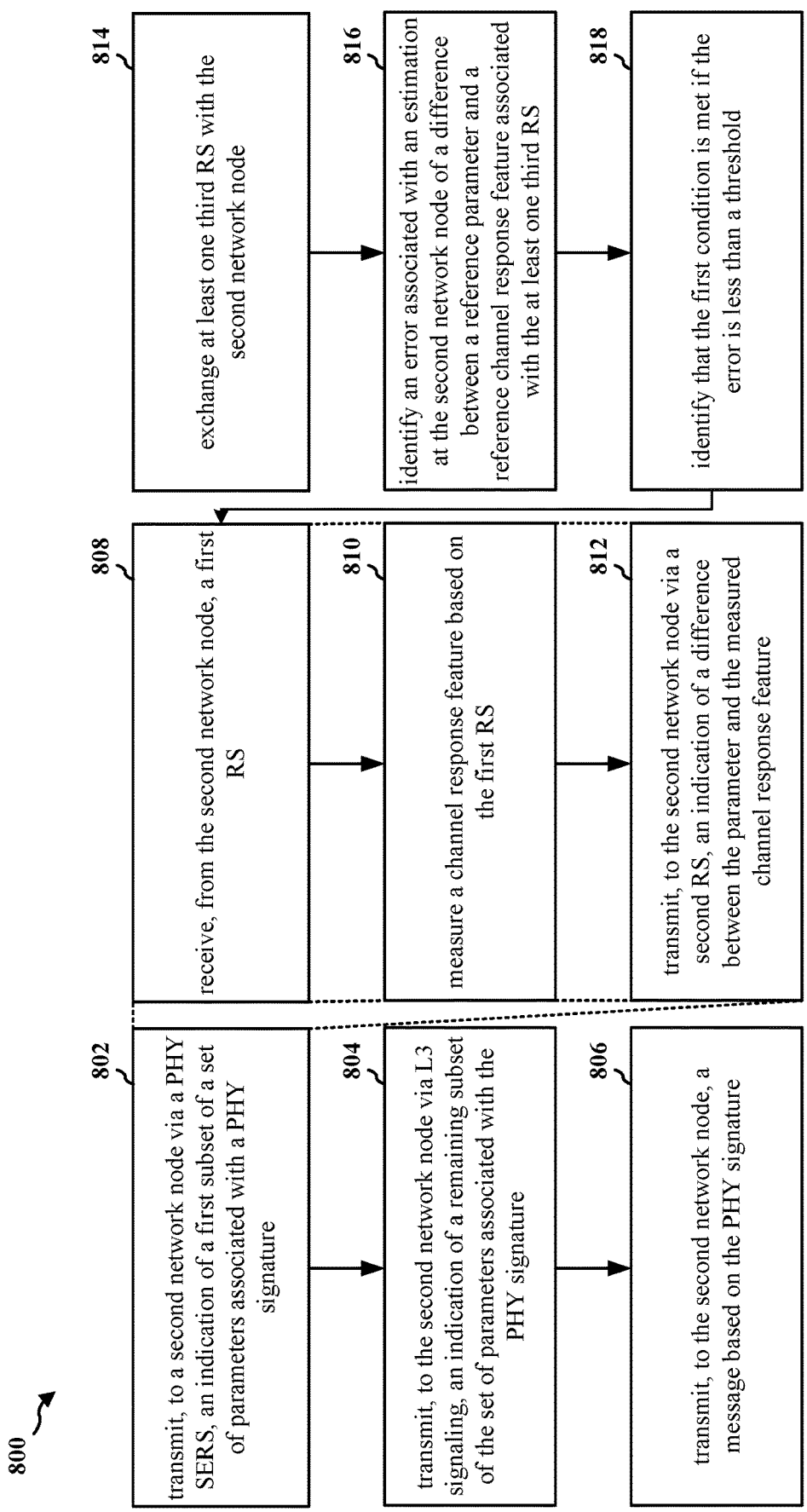
FIG. 8 is a flowchart of a method of wireless communication.

FIG. 8 is a flowchart 800 of a method of wireless communication. The method may be performed by a first network node (e.g., a transmitter) (e.g., the UE 104/350; the base station/network node 102/180/310; the first network node 602; the apparatus 1102). At 802, the first network node may transmit, to a second network node via a PHY SERS, an indication of a first subset of a set of parameters associated with a PHY signature. For example, 802 may be performed by the signal security component 1140 in FIG. 11. Referring to FIG. 6, at 624, the first network node 602 may transmit, to a second network node 604 via a PHY SERS, an indication of a first subset of a set of parameters associated with a PHY signature.

At 804, the first network node may transmit, to the second network node via L3 signaling, an indication of a remaining subset of the set of parameters associated with the PHY signature. For example, 804 may be performed by the signal security component 1140 in FIG. 11. Referring to FIG. 6, at 626, the first network node 602 may transmit, to the second network node 604 via L3 signaling, an indication of a remaining subset of the set of parameters associated with the PHY signature.

At 806, the first network node may transmit, to the second network node, a message based on the PHY signature. For example, 806 may be performed by the signal security component 1140 in FIG. 11. Referring to FIG. 6, at 628, the first network node 602 may transmit, to the second network node 604, a message based on the PHY signature.

In one configuration, the L3 signaling may correspond to RRC signaling.

In one configuration, the PHY signature may be an AMPM signature. The set of parameters associated with the PHY signature may include one or more of a number of cycles, a delay, a frequency of a sinusoidal function, or an amplitude of the sinusoidal function.

In one configuration, the PHY signature may be an FDRSB signature. The set of parameters associated with the PHY signature may include a plurality of filter parameters associated with an FDRSB.

In one configuration, at least one of the PHY SERS or the L3 signaling may include an authentication tag associated with the first network node. The authentication tag may be based at least on a time.

In one configuration, referring to FIG. 6, the authentication tag may be based further on an uninvertible function or a credential known to the first network node 602 and the second network node 604.

In one configuration, the credential may correspond to a cryptographic key or a unique ID.

In one configuration, to transmit, at 802, to the second network node via the PHY SERS, the indication of the first subset of the set of parameters associated with the PHY signature, if a first condition is met, for each parameter in the first subset, at 808, the first network node may receive, from the second network node, a first RS. For example, 808 may be performed by the signal security component 1140 in FIG. 11. Referring to FIG. 6, at 616, the first network node 602 may receive, from the second network node 604, a first RS.

At 810, the first network node may measure a channel response feature based on the first RS. For example, 810 may be performed by the signal security component 1140 in FIG. 11. Referring to FIG. 6, at 618, the first network node 602 may measure a channel response feature based on the first RS 616.

At 812, the first network node may transmit, to the second network node via a second RS, an indication of a difference between the parameter and the measured channel response feature. For example, 812 may be performed by the signal security component 1140 in FIG. 11. Referring to FIG. 6, at 620, the first network node 602 may transmit, to the second network node 604 via a second RS, an indication of a difference between the parameter and the measured channel response feature.

In one configuration, at least one of the first RS or the second RS may be a CSI-RS or an SRS.

In one configuration, the first RS and the second RS may be via a subcarrier corresponding to the parameter.

In one configuration, at 814, the first network node may exchange at least one third RS with the second network node. For example, 814 may be performed by the signal security component 1140 in FIG. 11. Referring to FIG. 6, at 616, the first network node 602 may exchange at least one third RS with the second network node 604.

At 816, the first network node may identify an error associated with an estimation at the second network node of a difference between a reference parameter and a reference channel response feature associated with the at least one third RS. For example, 816 may be performed by the signal security component 1140 in FIG. 11. Referring to FIG. 6, at 608, the first network node 602 may identify an error associated with an estimation at the second network node 604 of a difference between a reference parameter and a reference channel response feature associated with the at least one third RS 606.

At 818, the first network node may identify that the first condition is met if the error is less than a threshold. For example, 818 may be performed by the signal security component 1140 in FIG. 11. Referring to FIG. 6, at 612, the first network node 602 may identify that the first condition is met if the error is less than a threshold.

In one configuration, the error may be associated with a channel non-reciprocity or a second error associated with channel response estimation.

In one configuration, the channel response feature may be based on a first parameter in the first RS or a channel response. The first parameter may be based on a time or a beam pair.

In one configuration, the PHY SERS may be associated with a direction. A fourth RS may be associated with the PHY SERS based on a QCL relationship.

Figure 9:
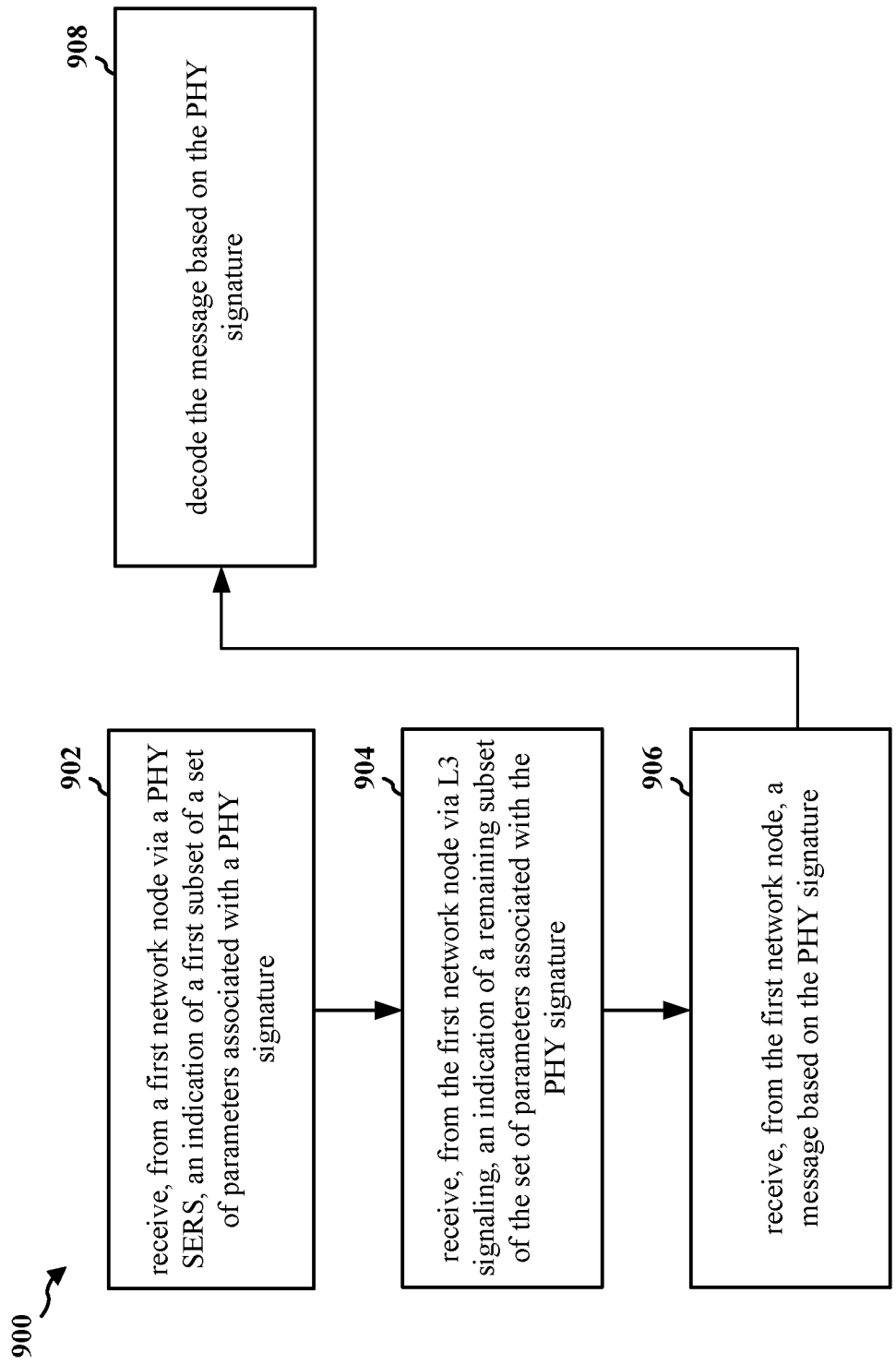
FIG. 9 is a flowchart of a method of wireless communication.

FIG. 9 is a flowchart 900 of a method of wireless communication. The method may be performed by a second network node (e.g., a receiver) (e.g., the UE 104/350; the base station/network node 102/180/310; the second network node 604; the apparatus 1202). At 902, the second network node may receive, from a first network node via a PHY SERS, an indication of a first subset of a set of parameters associated with a PHY signature. For example, 902 may be performed by the signal security component 1240 in FIG. 12. Referring to FIG. 6, at 624, the second network node 604 may receive, from a first network node 602 via a PHY SERS, an indication of a first subset of a set of parameters associated with a PHY signature.

At 904, the second network node may receive, from the first network node via L3 signaling, an indication of a remaining subset of the set of parameters associated with the PHY signature. For example, 904 may be performed by the signal security component 1240 in FIG. 12. Referring to FIG. 6, at 626, the second network node 904 may receive, from the first network node 902 via L3 signaling, an indication of a remaining subset of the set of parameters associated with the PHY signature.

At 906, the second network node may receive, from the first network node, a message based on the PHY signature. For example, 906 may be performed by the signal security component 1240 in FIG. 12. Referring to FIG. 6, at 628, the second network node 904 may receive, from the first network node 902, a message based on the PHY signature.

At 908, the second network node may decode the message based on the PHY signature. For example, 908 may be performed by the signal security component 1240 in FIG. 12. Referring to FIG. 6, at 630, the second network node 604 may decode the message based on the PHY signature.

Figure 10:
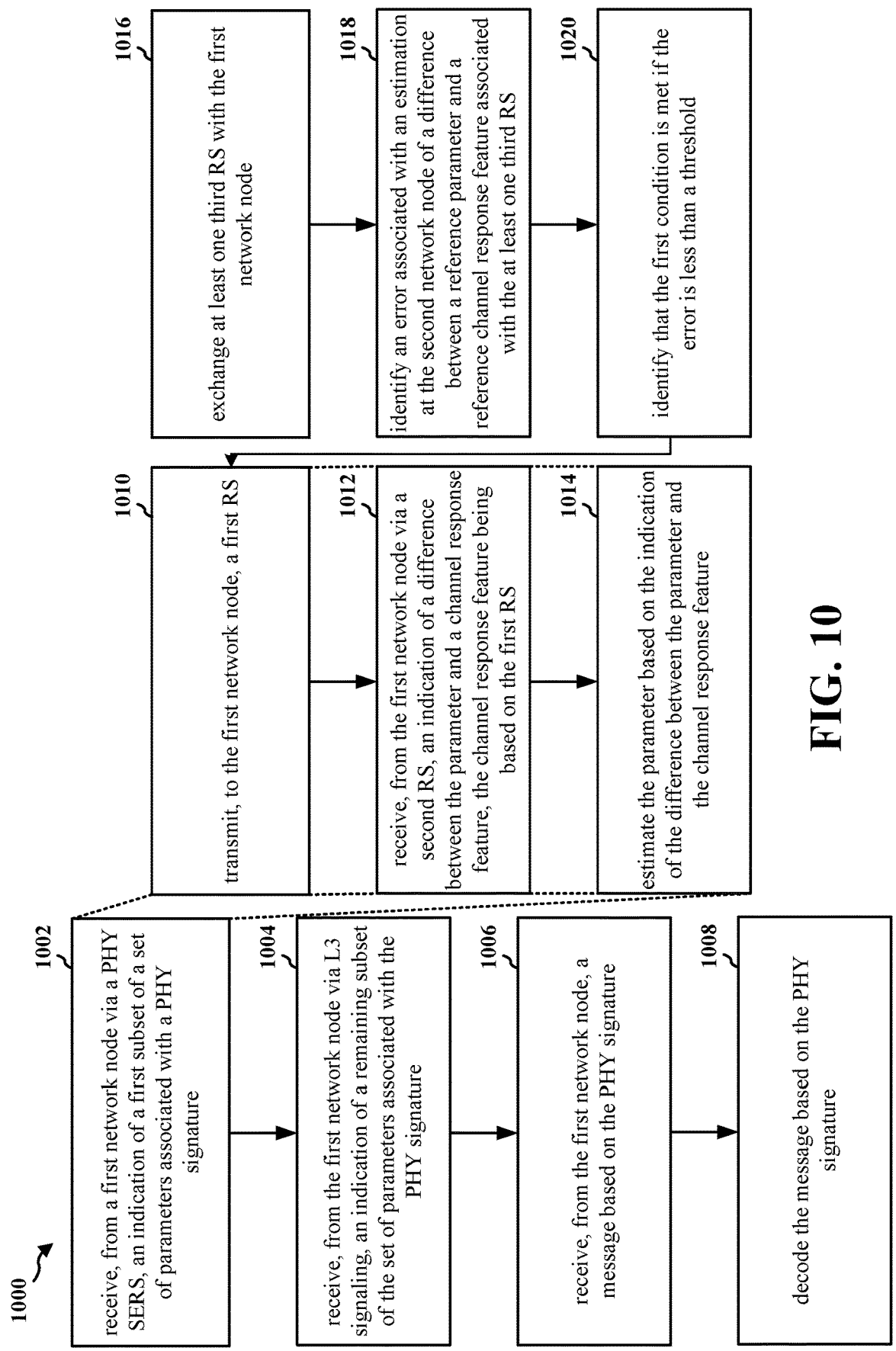
FIG. 10 is a flowchart of a method of wireless communication.

FIG. 10 is a flowchart 1000 of a method of wireless communication. The method may be performed by a second network node (e.g., a receiver) (e.g., the UE 104/350; the base station/network node 102/180/310; the second network node 604; the apparatus 1202). At 1002, the second network node may receive, from a first network node via a PHY SERS, an indication of a first subset of a set of parameters associated with a PHY signature. For example, 1002 may be performed by the signal security component 1240 in FIG. 12. Referring to FIG. 6, at 624, the second network node 604 may receive, from a first network node 602 via a PHY SERS, an indication of a first subset of a set of parameters associated with a PHY signature.

At 1004, the second network node may receive, from the first network node via L3 signaling, an indication of a remaining subset of the set of parameters associated with the PHY signature. For example, 1004 may be performed by the signal security component 1240 in FIG. 12. Referring to FIG. 6, at 626, the second network node 904 may receive, from the first network node 902 via L3 signaling, an indication of a remaining subset of the set of parameters associated with the PHY signature.

At 1006, the second network node may receive, from the first network node, a message based on the PHY signature. For example, 1006 may be performed by the signal security component 1240 in FIG. 12. Referring to FIG. 6, at 628, the second network node 904 may receive, from the first network node 902, a message based on the PHY signature.

At 1008, the second network node may decode the message based on the PHY signature. For example, 1008 may be performed by the signal security component 1240 in FIG. 12. Referring to FIG. 6, at 630, the second network node 604 may decode the message based on the PHY signature.

In one configuration, the L3 signaling may correspond to RRC signaling.

In one configuration, the PHY signature may be an AMPM signature. The set of parameters associated with the PHY signature may include one or more of a number of cycles, a delay, a frequency of a sinusoidal function, or an amplitude of the sinusoidal function.

In one configuration, the PHY signature may be an FDRSB signature. The set of parameters associated with the PHY signature may include a plurality of filter parameters associated with an FDRSB.

In one configuration, at least one of the PHY SERS or the L3 signaling may include an authentication tag associated with the first network node. The authentication tag may be based at least on a time.

In one configuration, referring to FIG. 6, the authentication tag may be based further on an uninvertible function or a credential known to the first network node 602 and the second network node 604.

In one configuration, the credential may correspond to a cryptographic key or a unique ID.

In one configuration, to receive, at 1002, from the first network node via the PHY SERS, the indication of the first subset of the set of parameters associated with the PHY signature, if a first condition is met, for each parameter in the first subset, at 1010, the second network node may transmit, to the first network node, a first RS. For example, 1010 may be performed by the signal security component 1240 in FIG. 12. Referring to FIG. 6, at 616, the second network node 604 may transmit, to the first network node 602, a first RS.

At 1012, the second network node may receive, from the first network node via a second RS, an indication of a difference between the parameter and a channel response feature. The channel response feature may be based on the first RS. For example, 1012 may be performed by the signal security component 1240 in FIG. 12. Referring to FIG. 6, at 620, the second network node 604 may receive, from the first network node 602 via a second RS, an indication of a difference between the parameter and a channel response feature.

At 1014, the second network node may estimate the parameter based on the indication of the difference between the parameter and the channel response feature. For example, 1014 may be performed by the signal security component 1240 in FIG. 12. Referring to FIG. 6, at 622, the second network node 604 may estimate the parameter based on the indication of the difference between the parameter and the channel response feature.

In one configuration, at least one of the first RS or the second RS may be a CSI-RS or an SRS.

In one configuration, the first RS and the second RS may be via a subcarrier corresponding to the parameter.

In one configuration, at 1016, the second network node may exchange at least one third RS with the first network node. For example, 1016 may be performed by the signal security component 1240 in FIG. 12. Referring to FIG. 6, at 606, the second network node 604 may exchange at least one third RS with the first network node 602.

At 1018, the second network node may identify an error associated with an estimation at the second network node of a difference between a reference parameter and a reference channel response feature associated with the at least one third RS. For example, 1018 may be performed by the signal security component 1240 in FIG. 12. Referring to FIG. 6, at 610, the second network node 604 may identify an error associated with an estimation at the second network node 604 of a difference between a reference parameter and a reference channel response feature associated with the at least one third RS 606.

At 1020, the second network node may identify that the first condition is met if the error is less than a threshold. For example, 1020 may be performed by the signal security component 1240 in FIG. 12. Referring to FIG. 6, at 614, the second network node 604 may identify that the first condition is met if the error is less than a threshold.

In one configuration, the error may be associated with a channel non-reciprocity or a second error associated with channel response estimation.

In one configuration, referring to FIG. 6, the channel response feature may be based on a first parameter included by the second network node 604 in the first RS or a channel response. The first parameter may be based on a time or a beam pair.

In one configuration, the PHY SERS may be associated with a direction. A fourth RS may be associated with the PHY SERS based on a QCL relationship.

Figure 11:
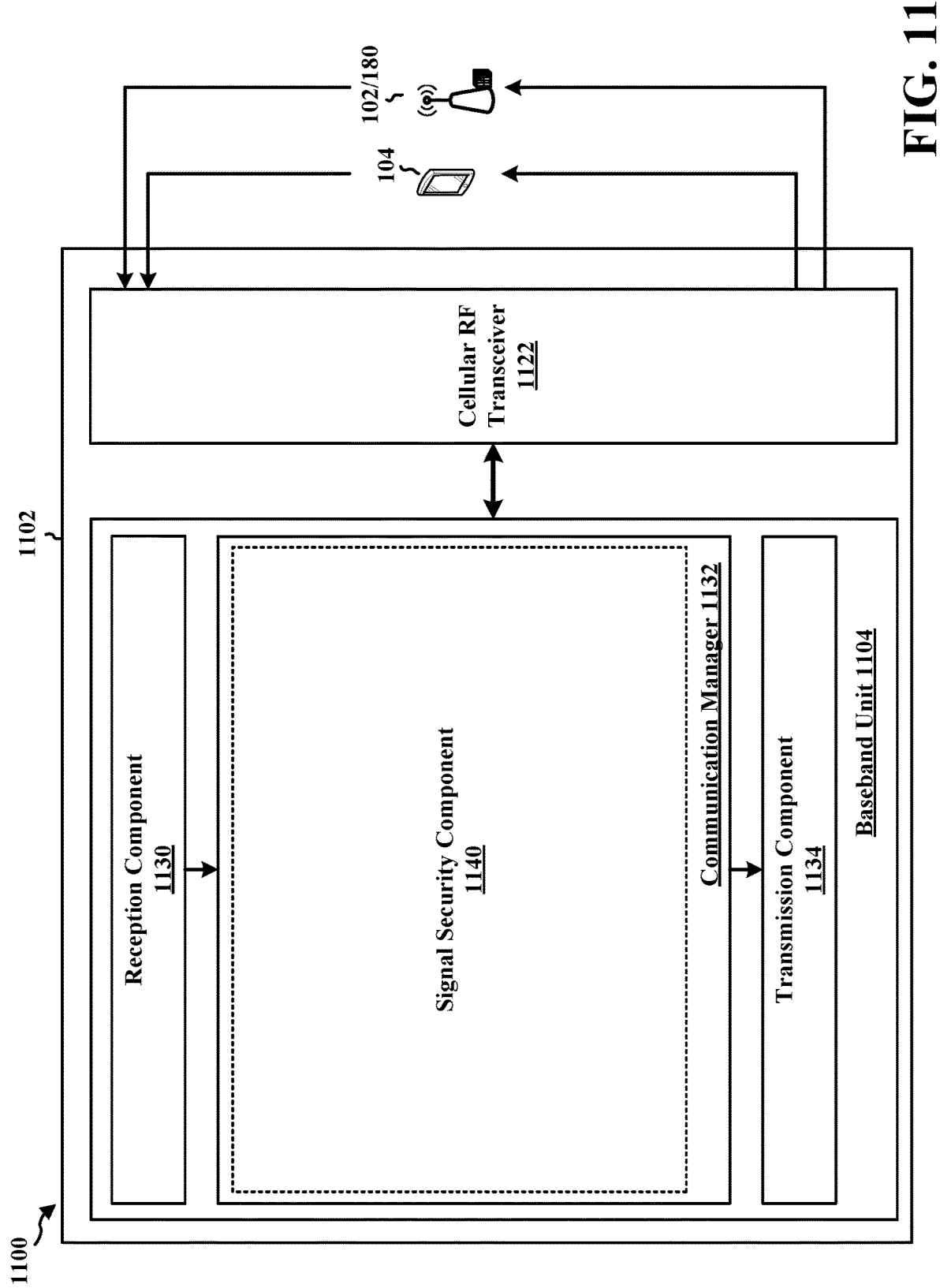
FIG. 11 is a diagram illustrating an example of a hardware implementation for an example apparatus.

FIG. 11 is a diagram 1100 illustrating an example of a hardware implementation for an apparatus 1102. The apparatus 1102 may be a first network node, a component of a first network node, or may implement first network node functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a signal security component 1140 that may be configured to transmit, to a second network node via a PHY SERS, an indication of a first subset of a set of parameters associated with a PHY signature, e.g., as described in connection with 702 in FIG. 7 and 802 in FIG. 8. The signal security component 1140 may be configured to transmit, to the second network node via L3 signaling, an indication of a remaining subset of the set of parameters associated with the PHY signature, e.g., as described in connection with 704 in FIG. 7 and 804 in FIG. 8. The signal security component 1140 may be configured to transmit, to the second network node, a message based on the PHY signature, e.g., as described in connection with 706 in FIG. 7 and 806 in FIG. 8. The signal security component 1140 may be configured to receive, from the second network node, a first RS, e.g., as described in connection with 808 in FIG. 8. The signal security component 1140 may be configured to measure a channel response feature based on the first RS, e.g., as described in connection with 810 in FIG. 8. The signal security component 1140 may be configured to transmit, to the second network node via a second RS, an indication of a difference between the parameter and the measured channel response feature, e.g., as described in connection with 812 in FIG. 8. The signal security component 1140 may be configured to exchange at least one third RS with the second network node, e.g., as described in connection with 814 in FIG. 8. The signal security component 1140 may be configured to identify an error associated with an estimation at the second network node of a difference between a reference parameter and a reference channel response feature associated with the at least one third RS, e.g., as described in connection with 816 in FIG. 8. The signal security component 1140 may be configured to identify that the first condition is met if the error is less than a threshold, e.g., as described in connection with 818 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a second network node via a PHY SERS, an indication of a first subset of a set of parameters associated with a PHY signature. The apparatus 1102, and in particular the baseband unit 1104, includes means for transmitting, to the second network node via L3 signaling, an indication of a remaining subset of the set of parameters associated with the PHY signature. The apparatus 1102, and in particular the baseband unit 1104, includes means for transmitting, to the second network node, a message based on the PHY signature.

In one configuration, the L3 signaling may correspond to RRC signaling. In one configuration, the PHY signature may be an AMPM signature. The set of parameters associated with the PHY signature may include one or more of a number of cycles, a delay, a frequency of a sinusoidal function, or an amplitude of the sinusoidal function. In one configuration, the PHY signature may be an FDRSB signature. The set of parameters associated with the PHY signature may include a plurality of filter parameters associated with an FDRSB. In one configuration, at least one of the PHY SERS or the L3 signaling may include an authentication tag associated with the first network node. The authentication tag may be based at least on a time. In one configuration, the authentication tag may be based further on an uninvertible function or a credential known to the first network node and the second network node. In one configuration, the credential may correspond to a cryptographic key or a unique ID. In one configuration, to transmit, to the second network node via the PHY SERS, the indication of the first subset of the set of parameters associated with the PHY signature, if a first condition is met, for each parameter in the first subset, the apparatus 1102, and in particular the baseband unit 1104, includes means for receiving, from the second network node, a first RS. The apparatus 1102, and in particular the baseband unit 1104, includes means for measuring a channel response feature based on the first RS. The apparatus 1102, and in particular the baseband unit 1104, includes means for transmitting, to the second network node via a second RS, an indication of a difference between the parameter and the measured channel response feature. In one configuration, at least one of the first RS or the second RS may be a CSI-RS or an SRS. In one configuration, the first RS and the second RS may be via a subcarrier corresponding to the parameter. In one configuration, the apparatus 1102, and in particular the baseband unit 1104, includes means for exchanging at least one third RS with the second network node. The apparatus 1102, and in particular the baseband unit 1104, includes means for identifying an error associated with an estimation at the second network node of a difference between a reference parameter and a reference channel response feature associated with the at least one third RS. The apparatus 1102, and in particular the baseband unit 1104, includes means for identifying that the first condition is met if the error is less than a threshold. In one configuration, the error may be associated with a channel non-reciprocity or a second error associated with channel response estimation. In one configuration, the channel response feature may be based on a first parameter in the first RS or a channel response. The first parameter may be based on a time or a beam pair. In one configuration, the PHY SERS may be associated with a direction. A fourth RS may be associated with the PHY SERS based on a QCL relationship.

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
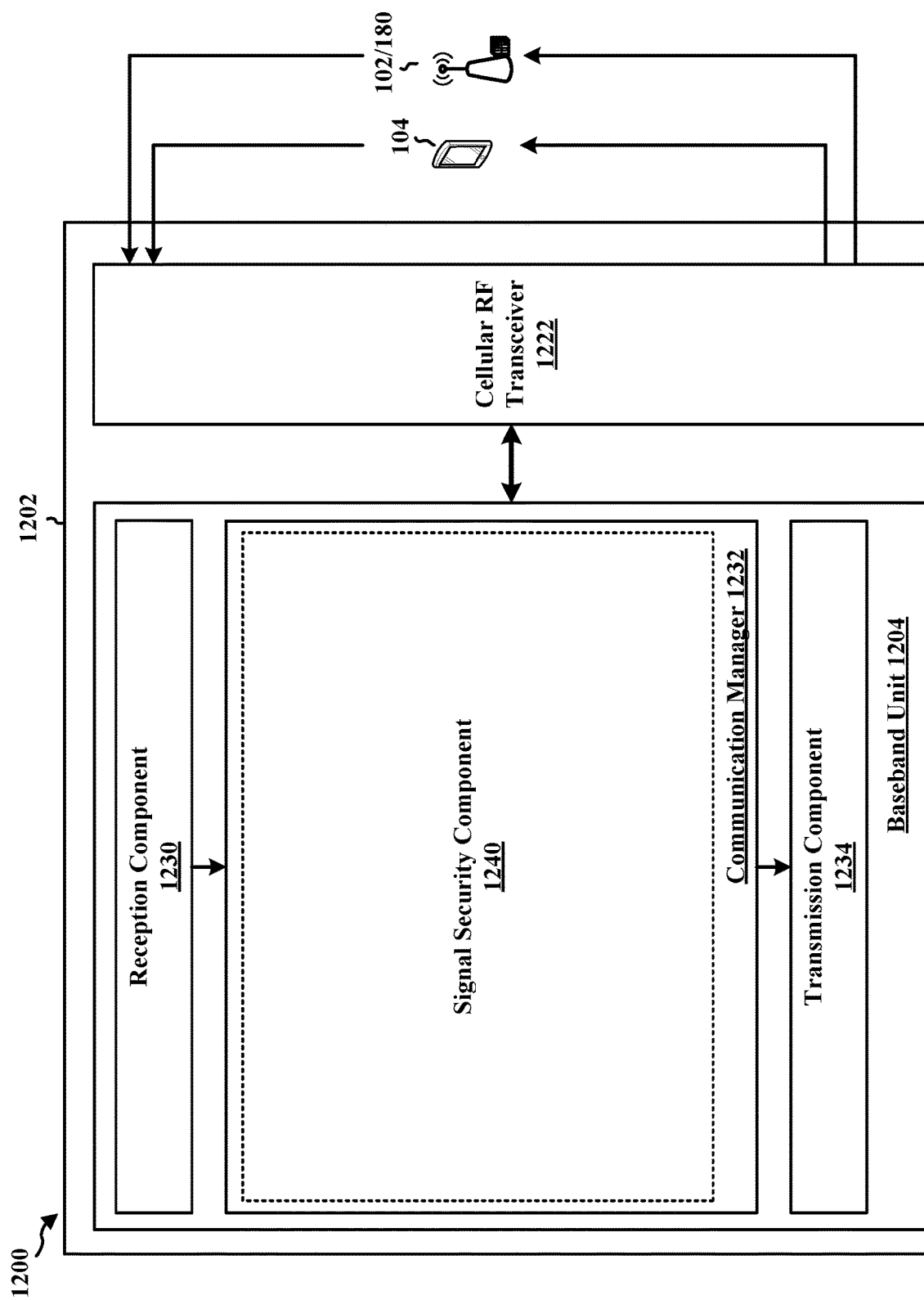
FIG. 12 is a diagram illustrating an example of a hardware implementation for an example apparatus.

FIG. 12 is a diagram 1200 illustrating an example of a hardware implementation for an apparatus 1202. The apparatus 1202 may be a second network node, a component of a second network node, or may implement second network node functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a signal security component 1240 that may be configured to receive, from a first network node via a PHY SERS, an indication of a first subset of a set of parameters associated with a PHY signature, e.g., as described in connection with 1002 in FIG. 10. The signal security component 1240 may be configured to receive, from the first network node via L3 signaling, an indication of a remaining subset of the set of parameters associated with the PHY signature, e.g., as described in connection with 1004 in FIG. 10. The signal security component 1240 may be configured to receive, from the first network node, a message based on the PHY signature, e.g., as described in connection with 1006 in FIG. 10. The signal security component 1240 may be configured to decode the message based on the PHY signature, e.g., as described in connection with 1008 in FIG. 10. The signal security component 1240 may be configured to transmit, to the first network node, a first RS, e.g., as described in connection with 1010 in FIG. 10. The signal security component 1240 may be configured to receive, from the first network node via a second RS, an indication of a difference between the parameter and a channel response feature, e.g., as described in connection with 1012 in FIG. 10. The signal security component 1240 may be configured to estimate the parameter based on the indication of the difference between the parameter and the channel response feature, e.g., as described in connection with 1014 in FIG. 10. The signal security component 1240 may be configured to exchange at least one third RS with the first network node, e.g., as described in connection with 1016 in FIG. 10. The signal security component 1240 may be configured to identify an error associated with an estimation at the second network node of a difference between a reference parameter and a reference channel response feature associated with the at least one third RS, e.g., as described in connection with 1018 in FIG. 10. The signal security component 1240 may be configured to identify that the first condition is met if the error is less than a threshold, e.g., as described in connection with 1020 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a first network node via a PHY SERS, an indication of a first subset of a set of parameters associated with a PHY signature. The apparatus 1202, and in particular the baseband unit 1204, includes means for receiving, from the first network node via L3 signaling, an indication of a remaining subset of the set of parameters associated with the PHY signature. The apparatus 1202, and in particular the baseband unit 1204, includes means for receiving, from the first network node, a message based on the PHY signature. The apparatus 1202, and in particular the baseband unit 1204, includes means for decoding the message based on the PHY signature.

In one configuration, the L3 signaling may correspond to RRC signaling. In one configuration, the PHY signature may be an AMPM signature. The set of parameters associated with the PHY signature may include one or more of a number of cycles, a delay, a frequency of a sinusoidal function, or an amplitude of the sinusoidal function. In one configuration, the PHY signature may be an FDRSB signature. The set of parameters associated with the PHY signature may include a plurality of filter parameters associated with an FDRSB. In one configuration, at least one of the PHY SERS or the L3 signaling may include an authentication tag associated with the first network node. The authentication tag may be based at least on a time. In one configuration, the authentication tag may be based further on an uninvertible function or a credential known to the first network node and the second network node. In one configuration, the credential may correspond to a cryptographic key or a unique ID. In one configuration, to receive, from the first network node via the PHY SERS, the indication of the first subset of the set of parameters associated with the PHY signature, if a first condition is met, for each parameter in the first subset, the apparatus 1202, and in particular the baseband unit 1204, includes means for transmitting, to the first network node, a first RS. The apparatus 1202, and in particular the baseband unit 1204, includes means for receiving, from the first network node via a second RS, an indication of a difference between the parameter and a channel response feature. The channel response feature may be based on the first RS. The apparatus 1202, and in particular the baseband unit 1204, includes means for estimating the parameter based on the indication of the difference between the parameter and the channel response feature. In one configuration, at least one of the first RS or the second RS may be a CSI-RS or an SRS. In one configuration, the first RS and the second RS may be via a subcarrier corresponding to the parameter. In one configuration, the apparatus 1202, and in particular the baseband unit 1204, includes means for exchanging at least one third RS with the first network node. The apparatus 1202, and in particular the baseband unit 1204, includes means for identifying an error associated with an estimation at the second network node of a difference between a reference parameter and a reference channel response feature associated with the at least one third RS. The apparatus 1202, and in particular the baseband unit 1204, includes means for identifying that the first condition is met if the error is less than a threshold. In one configuration, the error may be associated with a channel non-reciprocity or a second error associated with channel response estimation. In one configuration, the channel response feature may be based on a first parameter included by the second network node in the first RS or a channel response. The first parameter may be based on a time or a beam pair. In one configuration, the PHY SERS may be associated with a direction. A fourth RS may be associated with the PHY SERS based on a QCL relationship.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-12, a first network node may transmit, to a second network node via a PHY SERS, and the second network node may receive, from the first network node via the PHY SERS, an indication of a first subset of a set of parameters associated with a PHY signature. The first network node may transmit, to the second network node via L3 signaling, and the second network node may receive, from the first network node via L3 signaling, an indication of a remaining subset of the set of parameters associated with the PHY signature. The first network node may transmit, to the second network node, and the second network node may receive, from the first network node, a message based on the PHY signature. The second network node may decode the message based on the PHY signature. Accordingly, PHY security, confidentiality, or integrity may be achieved or improved. Malicious attacks in PHY may be thwarted.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first network node including at least one processor coupled to a memory and configured to transmit, to a second network node via a PHY SERS, an indication of a first subset of a set of parameters associated with a PHY signature; transmit, to the second network node via L3 signaling, an indication of a remaining subset of the set of parameters associated with the PHY signature; and transmit, to the second network node, a message based on the PHY signature.

Aspect 2 is the apparatus of aspect 1, where the L3 signaling corresponds to RRC signaling.

Aspect 3 is the apparatus of any of aspects 1 and 2, where the PHY signature is an AMPM signature, and the set of parameters associated with the PHY signature include one or more of a number of cycles, a delay, a frequency of a sinusoidal function, or an amplitude of the sinusoidal function.

Aspect 4 is the apparatus of any of aspects 1 and 2, where the PHY signature is an FDRSB signature, and the set of parameters associated with the PHY signature include a plurality of filter parameters associated with an FDRSB.

Aspect 5 is the apparatus of any of aspects 1 to 4, where at least one of the PHY SERS or the L3 signaling includes an authentication tag associated with the first network node, and the authentication tag is based at least on a time.

Aspect 6 is the apparatus of aspect 5, where the authentication tag is based further on an uninvertible function or a credential known to the first network node and the second network node.

Aspect 7 is the apparatus of aspect 6, where the credential corresponds to a cryptographic key or a unique ID.

Aspect 8 is the apparatus of any of aspects 1 to 7, where to transmit, to the second network node via the PHY SERS, the indication of the first subset of the set of parameters associated with the PHY signature, if a first condition is met, then the at least one processor is, for each parameter in the first subset, further configured to: receive, from the second network node, a first RS; measure a channel response feature based on the first RS; and transmit, to the second network node via a second RS, an indication of a difference between the parameter and the measured channel response feature.

Aspect 9 is the apparatus of aspect 8, where at least one of the first RS or the second RS is a CSI-RS or an SRS.

Aspect 10 is the apparatus of any of aspects 8 and 9, where the first RS and the second RS are via a subcarrier corresponding to the parameter.

Aspect 11 is the apparatus of any of aspects 8 to 10, the at least one processor being further configured to: exchange at least one third RS with the second network node; identify an error associated with an estimation at the second network node of a difference between a reference parameter and a reference channel response feature associated with the at least one third RS; and identify that the first condition is met if the error is less than a threshold.

Aspect 12 is the apparatus of aspect 11, where the error is associated with a channel non-reciprocity or a second error associated with channel response estimation.

Aspect 13 is the apparatus of any of aspects 8 to 12, where the channel response feature is based on a first parameter in the first RS or a channel response, and the first parameter is based on a time or a beam pair.

Aspect 14 is the apparatus of any of aspects 1 to 13, where the PHY SERS is associated with a direction, and a fourth RS is associated with the PHY SERS based on a QCL relationship.

Aspect 15 is the apparatus of any of aspects 1 to 14, further including a transceiver coupled to the at least one processor.

Aspect 16 is an apparatus for wireless communication at a second network node including at least one processor coupled to a memory and configured to receive, from a first network node via a PHY SERS, an indication of a first subset of a set of parameters associated with a PHY signature; receive, from the first network node via L3 signaling, an indication of a remaining subset of the set of parameters associated with the PHY signature; receive, from the first network node, a message based on the PHY signature; and decode the message based on the PHY signature.

Aspect 17 is the apparatus of aspect 16, where the L3 signaling corresponds to RRC signaling.

Aspect 18 is the apparatus of any of aspects 16 and 17, where the PHY signature is an AMPM signature, and the set of parameters associated with the PHY signature include one or more of a number of cycles, a delay, a frequency of a sinusoidal function, or an amplitude of the sinusoidal function.

Aspect 19 is the apparatus of any of aspects 16 and 17, where the PHY signature is an FDRSB signature, and the set of parameters associated with the PHY signature include a plurality of filter parameters associated with an FDRSB.

Aspect 20 is the apparatus of any of aspects 16 to 19, where at least one of the PHY SERS or the L3 signaling includes an authentication tag associated with the first network node, and the authentication tag is based at least on a time.

Aspect 21 is the apparatus of aspect 20, where the authentication tag is based further on an uninvertible function or a credential known to the first network node and the second network node.

Aspect 22 is the apparatus of aspect 21, where the credential corresponds to a cryptographic key or a unique ID.

Aspect 23 is the apparatus of any of aspects 16 to 22, where to receive, from the first network node via the PHY SERS, the indication of the first subset of the set of parameters associated with the PHY signature, if a first condition is met, the at least one processor is, for each parameter in the first subset, further configured to: transmit, to the first network node, a first RS; receive, from the first network node via a second RS, an indication of a difference between the parameter and a channel response feature, the channel response feature being based on the first RS; and estimate the parameter based on the indication of the difference between the parameter and the channel response feature.

Aspect 24 is the apparatus of aspect 23, where at least one of the first RS or the second RS is a CSI-RS or an SRS.

Aspect 25 is the apparatus of any of aspects 23 and 24, where the first RS and the second RS are via a subcarrier corresponding to the parameter.

Aspect 26 is the apparatus of any of aspects 23 to 25, the at least one processor being further configured to: exchange at least one third RS with the first network node; identify an error associated with an estimation at the second network node of a difference between a reference parameter and a reference channel response feature associated with the at least one third RS; and identify that the first condition is met if the error is less than a threshold.

Aspect 27 is the apparatus of aspect 26, where the error is associated with a channel non-reciprocity or a second error associated with channel response estimation.

Aspect 28 is the apparatus of any of aspects 23 to 27, where the channel response feature is based on a first parameter included by the second network node in the first RS or a channel response, and the first parameter is based on a time or a beam pair.

Aspect 29 is the apparatus of any of aspects 16 to 28, where the PHY SERS is associated with a direction and a fourth RS is associated with the PHY SERS based on a QCL relationship.

Aspect 30 is the apparatus of any of aspects 16 to 29, further including a transceiver coupled to the at least one processor.

Aspect 31 is a method of wireless communication for implementing any of aspects 1 to 30.

Aspect 32 is an apparatus for wireless communication including means for implementing any of aspects 1 to 30.

Aspect 33 is a computer-readable medium storing computer executable code, where the code when executed by a processor causes the processor to implement any of aspects 1 to 30.

What is claimed is:

1. An apparatus for wireless communication at a first network node, comprising:
    a memory; and
    at least one processor coupled to the memory and configured to:
       transmit, to a second network node via a physical layer (PHY) security reference signal (RS) (SERS), an indication of a first subset of a set of parameters associated with a PHY signature;
       transmit, to the second network node via layer 3 (L3) signaling, an indication of a remaining subset of the set of parameters associated with the PHY signature; and
       transmit, to the second network node, a message based on the PHY signature.

2. The apparatus of claim 1, wherein the L3 signaling corresponds to radio resource control (RRC) signaling.

3. The apparatus of claim 1, wherein the PHY signature is an amplitude-modulation-to-phase-modulation (AMPM) signature, and the set of parameters associated with the PHY signature comprise one or more of a number of cycles, a delay, a frequency of a sinusoidal function, or an amplitude of the sinusoidal function.

4. The apparatus of claim 1, wherein the PHY signature is a frequency domain residual sideband (FDRSB) signature, and the set of parameters associated with the PHY signature comprise a plurality of filter parameters associated with an FDRSB.

5. The apparatus of claim 1, wherein at least one of the PHY SERS or the L3 signaling comprises an authentication tag associated with the first network node, and the authentication tag is based at least on a time.

6. The apparatus of claim 5, wherein the authentication tag is based further on an uninvertible function or a credential known to the first network node and the second network node.

7. The apparatus of claim 6, wherein the credential corresponds to a cryptographic key or a unique identifier (ID).

8. The apparatus of claim 1, wherein to transmit, to the second network node via the PHY SERS, the indication of the first subset of the set of parameters associated with the PHY signature, if a first condition is met, then the at least one processor is, for each parameter in the first subset, further configured to:
   receive, from the second network node, a first RS;
   measure a channel response feature based on the first RS; and
   transmit, to the second network node via a second RS, an indication of a difference between the parameter and the measured channel response feature.

9. The apparatus of claim 8, wherein at least one of the first RS or the second RS is a channel state information (CSI)-RS (CSI-RS) or a sounding RS (SRS).

10. The apparatus of claim 8, wherein the first RS and the second RS are via a subcarrier corresponding to the parameter.

11. The apparatus of claim 8, the at least one processor being further configured to:
   exchange at least one third RS with the second network node;
   identify an error associated with an estimation at the second network node of a difference between a reference parameter and a reference channel response feature associated with the at least one third RS; and
   identify that the first condition is met if the error is less than a threshold.

12. The apparatus of claim 11, wherein the error is associated with a channel non-reciprocity or a second error associated with channel response estimation.

13. The apparatus of claim 8, wherein the channel response feature is based on a first parameter in the first RS or a channel response, and the first parameter is based on a time or a beam pair.

14. The apparatus of claim 1, further comprising a transceiver coupled to the at least one processor, wherein the PHY SERS is associated with a direction, and a fourth RS is associated with the PHY SERS based on a quasi co-location (QCL) relationship.

15. A method of wireless communication at a first network node, comprising:
   transmitting, to a second network node via a physical layer (PHY) security reference signal (RS) (SERS), an indication of a first subset of a set of parameters associated with a PHY signature;
   transmitting, to the second network node via layer 3 (L3) signaling, an indication of a remaining subset of the set of parameters associated with the PHY signature; and
   transmitting, to the second network node, a message based on the PHY signature.

16. An apparatus for wireless communication at a second network node, comprising:
   a memory; and
   at least one processor coupled to the memory and configured to:
      receive, from a first network node via a physical layer (PHY) security reference signal (RS) (SERS), an indication of a first subset of a set of parameters associated with a PHY signature;
      receive, from the first network node via layer 3 (L3) signaling, an indication of a remaining subset of the set of parameters associated with the PHY signature;
      receive, from the first network node, a message based on the PHY signature; and
      decode the message based on the PHY signature.

17. The apparatus of claim 16, wherein the L3 signaling corresponds to radio resource control (RRC) signaling.

18. The apparatus of claim 16, wherein the PHY signature is an amplitude-modulation-to-phase-modulation (AMPM) signature, and the set of parameters associated with the PHY signature comprise one or more of a number of cycles, a delay, a frequency of a sinusoidal function, or an amplitude of the sinusoidal function.

19. The apparatus of claim 16, wherein the PHY signature is a frequency domain residual sideband (FDRSB) signature, and the set of parameters associated with the PHY signature comprise a plurality of filter parameters associated with an FDRSB.

20. The apparatus of claim 16, wherein at least one of the PHY SERS or the L3 signaling comprises an authentication tag associated with the first network node, and the authentication tag is based at least on a time.

21. The apparatus of claim 20, wherein the authentication tag is based further on an uninvertible function or a credential known to the first network node and the second network node.

22. The apparatus of claim 21, wherein the credential corresponds to a cryptographic key or a unique identifier (ID).

23. The apparatus of claim 16, wherein to receive, from the first network node via the PHY SERS, the indication of the first subset of the set of parameters associated with the PHY signature, if a first condition is met, then the at least one processor is, for each parameter in the first subset, further configured to:
   transmit, to the first network node, a first RS;
   receive, from the first network node via a second RS, an indication of a difference between the parameter and a channel response feature, the channel response feature being based on the first RS; and
   estimate the parameter based on the indication of the difference between the parameter and the channel response feature.

24. The apparatus of claim 23, wherein at least one of the first RS or the second RS is a channel state information (CSI)-RS (CSI-RS) or a sounding RS (SRS).

25. The apparatus of claim 23, wherein the first RS and the second RS are via a subcarrier corresponding to the parameter.

26. The apparatus of claim 23, the at least one processor being further configured to:
   exchange at least one third RS with the first network node;
   identify an error associated with an estimation at the second network node of a difference between a reference parameter and a reference channel response feature associated with the at least one third RS; and
   identify that the first condition is met if the error is less than a threshold.

27. The apparatus of claim 26, wherein the error is associated with a channel non-reciprocity or a second error associated with channel response estimation.

28. The apparatus of claim 23, wherein the channel response feature is based on a first parameter included by the second network node in the first RS or a channel response, and the first parameter is based on a time or a beam pair.

29. The apparatus of claim 16, further comprising a transceiver coupled to the at least one processor, wherein the PHY SERS is associated with a direction, and a fourth RS is associated with the PHY SERS based on a quasi co-location (QCL) relationship.

30. A method of wireless communication at a second network node, comprising:
- receiving, from a first network node via a physical layer (PHY) security reference signal (RS) (SERS), an indication of a first subset of a set of parameters associated with a PHY signature;
- receiving, from the first network node via layer 3 (L3) signaling, an indication of a remaining subset of the set of parameters associated with the PHY signature;
- receiving, from the first network node, a message based on the PHY signature; and
- decoding the message based on the PHY signature.

* * * * *